(12) United States Patent
Wang

(10) Patent No.: US 8,937,819 B2
(45) Date of Patent: Jan. 20, 2015

(54) INTEGRATED CONTROL CIRCUIT OF SETTING BROWN-IN VOLTAGE AND COMPENSATING OUTPUT POWER AND METHOD FOR OPERATING THE SAME

(75) Inventor: Kuan-Sheng Wang, Taipei (TW)

(73) Assignee: Neoenergy Microelectronics, Inc., Hsinchu County (TW)

( * ) Notice: Subject to any disclaimer, the term of this patent is extended or adjusted under 35 U.S.C. 154(b) by 257 days.

(21) Appl. No.: 13/243,695

(22) Filed: Sep. 23, 2011

(65) Prior Publication Data

US 2012/0262947 A1 Oct. 18, 2012

(30) Foreign Application Priority Data

Apr. 13, 2011 (TW) .............................. 100112731 A

(51) Int. Cl.
*H02M 3/335* (2006.01)
*H02M 1/00* (2006.01)

(52) U.S. Cl.
CPC ...... *H02M 3/335* (2013.01); *H02M 2001/0006* (2013.01)
USPC .................................................... 363/21.12

(58) Field of Classification Search
CPC ............ H02M 3/335; H02M 3/33507; H02M 3/33523; G05F 1/569; G05F 1/571; G05F 1/573
USPC ......... 363/15, 21.01, 21.12, 21.15, 50, 56.11, 363/89, 124; 361/92, 93.9
See application file for complete search history.

(56) References Cited

U.S. PATENT DOCUMENTS

| 6,281,658 | B1 | 8/2001 | Han et al. |
| 7,054,170 | B2* | 5/2006 | Yang et al. ................. 363/21.18 |
| 7,447,601 | B2* | 11/2008 | Lhermite et al. ................ 702/60 |
| 7,479,713 | B2* | 1/2009 | Tanner ........................... 307/31 |

FOREIGN PATENT DOCUMENTS

| CN | 1964172 A | 5/2007 |
| CN | 201226496 Y | 4/2009 |
| CN | 101924471 A | 12/2010 |
| DE | 102004025597 A1 | 12/2005 |
| DE | 102009047984 A1 | 4/2011 |
| TW | M327600 U | 2/2008 |
| TW | 201025814 A | 7/2010 |

* cited by examiner

*Primary Examiner* — Adolf Berhane
*Assistant Examiner* — Yemane Mehari
(74) *Attorney, Agent, or Firm* — Muncy, Geissler, Olds & Lowe, P.C.

(57) ABSTRACT

An integrated control circuit of setting brown-in voltage and compensating output power and a method for operating the same are disclosed. The integrated control circuit is applied to a power supply. The integrated control circuit includes a control unit and a voltage regulation unit. The control unit has a control pin and a driven current outputs from or inputs into the control unit via the control pin. The voltage regulation is electrically connected to a DC input voltage terminal of the power supply and the control unit, thus receiving a DC input voltage and the driven current. By dividing the DC input voltage and the produced voltage by the driven current, a compound voltage is produced. Therefore, the fixed brown-in voltage is set and the output power is compensated when the power supply is operated under different input voltage levels.

13 Claims, 4 Drawing Sheets

INTEGRATED CONTROL CIRCUIT OF SETTING BROWN-IN VOLTAGE AND COMPENSATING OUTPUT POWER AND METHOD FOR OPERATING THE SAME

BACKGROUND OF THE INVENTION

1. Field of the Invention

The present invention relates generally to an integrated control circuit of setting brown-in voltage and compensating output power and a method for operating the same, and more particularly to an integrated control circuit of setting brown-in voltage and compensating output power and a method for operating the same which are applied to a power supply.

2. Description of Prior Art

A power supply is used to provide stable output voltage and current and regulate power to electronic devices. In order to conform to corresponding standard of rated voltage of using electrical equipment in different countries, the power supply usually provides an over-power protection, thus protecting the power supply itself and a power source end therefore by limiting the amount of the output power or shutting down the power supply when the faults (such as an over-load operation or an abnormal short or open circuit operation) occur.

In addition, a brown-in voltage setting of the power supply is also important to prevent the power supply from an abnormal brown out operation, thus assuring that the power supply is operated at a normal voltage range of the AC input voltage.

In the conventional practice, the functions of setting brown-in voltage and compensating output power are implemented through different IC chip pins, thus reducing the usability of the IC chips. If the integrated functions of setting brown-in voltage and compensating output power need to be implemented using the same IC chip pin, however, only one function can be realized. That is, the output power compensation cannot be implemented once the brown-in voltage is fixed; on the other hand, the fixed brown-in voltage setting cannot be implemented once the output power is compensated.

Accordingly, it is desirable to provide an integrated control circuit of setting brown-in voltage and compensating output power and a method for operating the same to fix the brown-in voltage and compensate the output power when the power supply is operated under different input voltage levels.

SUMMARY OF THE INVENTION

An object of the invention is to provide an integrated control circuit of setting brown-in voltage and compensating output power to solve the above-mentioned problems. The integrated control circuit is applied to a power supply. The integrated control circuit includes a control unit and a voltage regulation unit.

The control unit has a control pin and the control unit outputs or inputs a driven current via the control pin. The voltage regulation unit is electrically connected to the control unit and a DC input voltage terminal of the power supply. The voltage regulation unit receives a DC input voltage and the driven current to produce a compound voltage according to the DC input voltage and the driven current.

The compound voltage is detected by the integrated circuit. The brown-in condition is detected if the compound voltage is lower than a preset threshold, which indicates the power supply voltage is too low and the integrated circuit will enter a power down mode. If the compound voltage exceeds the preset limit, the integrated circuit will power up normally. During normal operation, the compound voltage is monitored for output power compensation purpose. To avoid the system over delivers powers when the power supply voltage is high, the integrated circuit will reduce the maximum output current according to the power supply voltage detected. The degree of deduction usually depends on the system requirement hence it is desirable that system designers are able to adjust the compound voltage levels according to their design need.

The requirement of the compound voltage as a function of power supply voltage is illustrated in FIG. 5. In this example, the integrated circuit detects the compound voltage. For brown-in dictation, it is desirable that the voltage is fixed at low power supply voltage such as 70 volts. As the power supply voltage increases, another desirable feature is that the slope of the curve is adjustable by the user such that he can chose the right compound voltages and perform proper over-power protection as discussed early.

The simplest voltage regulation unit can be implemented by a two resistors, which is commonly used for generating voltage for brown-in detection, as illustrated in FIG. 6. In FIG. 6, two resistors (R1, R2) divide the power supply voltage Vb to a voltage Vc. The resistors are selected that Vc equals to the brown-in detection voltage as illustrated in FIG. 5. The circuit is simple but has its limitation that Vc as a function of Vb is fixed. If the user adjusts the slope of the function, the Brown-in voltage will be affected.

On the contrary, the proposed method in this invention generates the compound voltage that can be adjusted to provide the output power compensation and fix the brown-in voltage in accordance with different output powers of the power supply.

Another object of the invention is to provide a method for operating an integrated control circuit of setting brown-in voltage and compensating output power to solve the above-mentioned problems. The integrated control circuit is applied to a power supply. The method for operating the integrated control circuit includes the steps as follows: First, a control unit is provided. The control unit has a control pin and the control unit outputs or inputs a driven current via the control pin. Afterward, a voltage regulation unit is provided to receive a DC input voltage and the driven current. Afterward, a compound voltage is produced by adjusting the DC input voltage and the driven current. Finally, the compound voltage is adjusted to provide the output power compensation and fix the brown-in voltage in accordance with different output powers of the power supply.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1A:
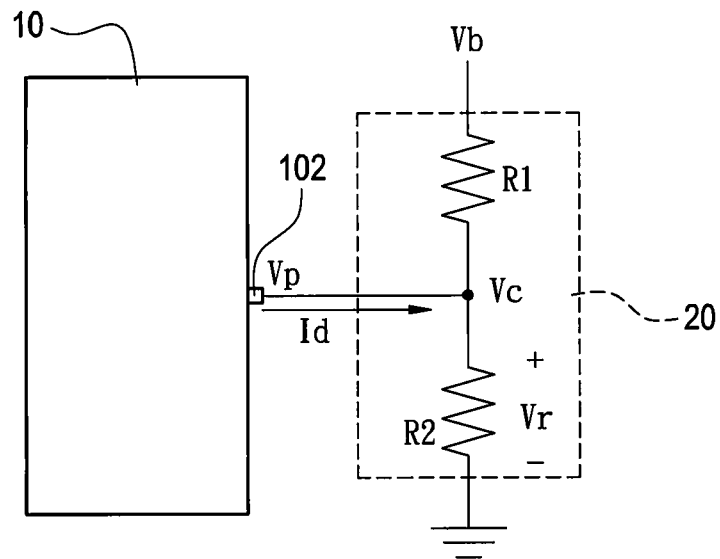
FIG. 1A is a schematic circuit diagram of an integrated control circuit of setting brown-in voltage and compensating output power according to the present invention.

Reference will now be made to the drawing figures to describe the present invention in detail.

Reference is made to FIG. 1A which is a schematic circuit diagram of an integrated control circuit of setting brown-in voltage and compensating output power according to the present invention. The integrated control circuit is applied to a power supply, and the integrated control circuit includes a control unit 10 and a voltage regulation unit 20.

Figure 1B:
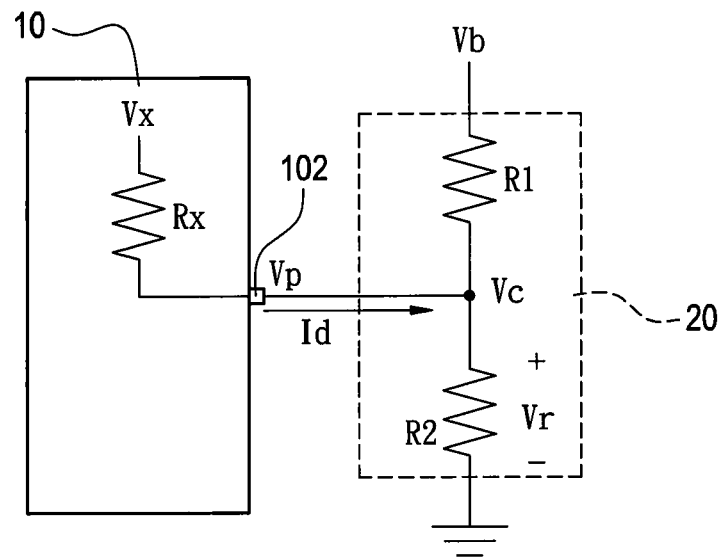
FIG. 1B is a schematic circuit diagram of the integrated control circuit of setting brown-in voltage and compensating output power according to another embodiment of the present invention.

The control unit 10 has a control pin 102, and the control unit 10 outputs or inputs a driven current Id via the control pin 102. In particular, the driven current Id can be a sourcing current which outward flows from the control unit 10 via the control pin 102. That is, the control unit 10 outputs the sourcing current Id via the control pin 102. In addition, the driven current Id can be a sinking current which inward flows into the control unit 10 via the control pin 102. That is, the control unit 10 inputs the sinking current Id via the control pin 102. In this embodiment, the sourcing current is exemplified as the driven current Id to further demonstrate the present invention. Furthermore, reference is made to FIG. 1B which is a schematic circuit diagram of the integrated control circuit of setting brown-in voltage and compensating output power according to another embodiment of the present invention. In particular, the driven current Id can be also produced through an inner voltage source Vx and an inner resistor Rx of the control unit 10. Hence, the inner voltage source Vx and the inner resistor Rx can are used for the same effect to the driven current Id.

Figure 2:
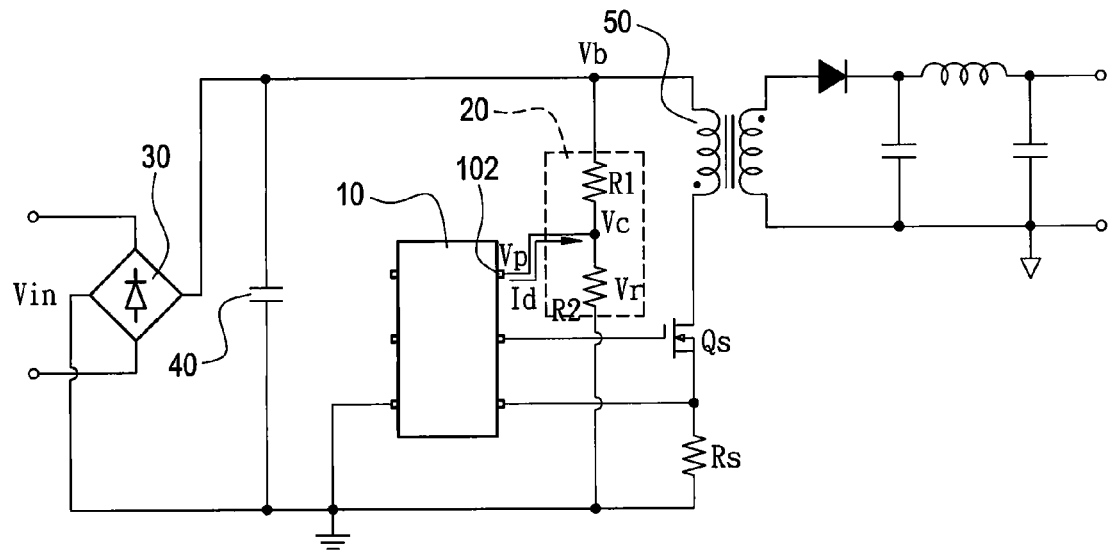
FIG. 2 is a circuit diagram of the integrated control circuit applied to a power supply.

The voltage regulation unit 20 is electrically connected to the control unit 10 and a DC input voltage terminal (not labeled) of the power supply, and receives a DC input voltage Vb and the driven current Id to produce a compound voltage Vc according to the DC input voltage Vb and the driven current Id. The DC input voltage Vb is acquired by rectifying and filtering an external AC input voltage (as shown in FIG. 2) received by the power supply. The voltage regulation unit 20 includes a first resistor unit R1 and a second resistor unit R2. The first resistor unit R1 has a first terminal (not labeled) and a second terminal (not labeled). The first terminal is electrically connected to the DC input voltage terminal of the power supply and the second terminal is electrically connected to the control pin 102 of the control unit 10. The second resistor unit R2 has a third terminal (not labeled) and a fourth terminal (not labeled). The third terminal is electrically connected to the control pin 102 of the control unit 10 and the fourth terminal is grounded.

As shown in FIG. 1A, the first resistor unit R1 is electrically connected in series to the second resistor unit R2. Hence, the DC input voltage Vb is divided to produce a pin voltage Vp, namely, $Vp=Vb \times R2/(R1+R2)$. In addition, the driven current Id flows through the second resistor unit R2 to produce a drop voltage Vr, namely, $Vr=Id \times (R1/(R1+R2)) \times R2$. In particular, the first resistor unit R1 is usually designed to be much greater than the second resistor unit R2, therefore, the drop voltage Vr can be approximated by $Vr=Id \times R2$. According to the superposition principle, the compound voltage Vc equals the sum of the pin voltage Vp and the drop voltage Vr, namely, $Vc=Vp+Vr$.

The detailed circuit structure and operation of the integrated control circuit can be described as follows, but it will be understood that the invention is not limited to the details thereof. In this embodiment, a 6-pin integrated circuit chip is exemplified for further demonstration. Reference is made to FIG. 2 which is a circuit diagram of the integrated control circuit applied to a power supply.

Besides the control unit 10 and the voltage regulation unit 20, the power supply further includes a bridge rectifier 30, a filtering capacitor 40 in an input side thereof, and a flyback converter 50. The power supply receives an external AC input voltage Vin, and the AC input voltage Vin is rectified and filtered to produce the DC input voltage Vb through the bridge rectifier 30 and the filtering capacitor 40, respectively. The voltage regulation unit 20 is electrically connected in parallel to the filtering capacitor 40 to receive the DC input voltage Vb. The control pin 102 of the control unit 10 is electrically connected to the voltage regulation unit 20. In this embodiment, the voltage regulation unit 20 includes the first resistor unit R1 and the second resistor unit R2, and the first resistor unit R1 is electrically connected in series to the second resistor unit R2. Also, the control pin 102 of the control unit 10 is electrically connected to the first resistor unit R1 and the second resistor unit R2. Hence, the DC input voltage Vb is divided to produce the pin voltage Vp, namely, $Vp=Vb \times R2/(R1+R2)$.

In addition, the driven current Id flows through the second resistor unit R2 to produce the drop voltage Vr, namely, $Vr=Id \times R2$.

According to the superposition principle, the compound voltage Vc equals the sum of the pin voltage Vp and the drop voltage Vr, namely, $Vc=Vp+Vr$.

Therefore, the compound voltage Vc can be adjusted to provide the output power compensation and fix the brown-in voltage in accordance with different output powers of the power supply.

The detailed operation of setting brown-in voltage and compensating output power is described as follows.

In the case of the brown-in voltage setting of the power supply is described as follows: A power control circuit (not shown) of the control unit 10 is turned on to start up the control unit 10 when the AC input voltage Vin is great enough to drive the control unit 10. At this time, the control unit 10 continuously monitors the compound voltage Vc. Hence, the compound voltage Vc is directly detected to judge whether the AC input voltage Vin exceeds the brown-in voltage or not. If the AC input voltage Vin exceeds the brown-in voltage, the power supply is normally operated. On the other hand, the flyback converter 50 does not be driven by the control unit 10 and no energy is transmitted from the flyback converter 50 if the AC input voltage Vin does not exceed the brown-in voltage. Accordingly, the power supply can be operated within the normal voltage range of the AC input voltage Vin.

In the case of the output power compensation of the power supply is described as follows: The power switch Qs is electrically connected in series to a sensing resistor Rs and the sensing resistor Rs is used to acquire a current flowing through the power switch Qs, thus the output power of the power supply can be decided. Hence, the output power compensation of the power supply can be implemented so that the power supply is operated with an over-power protection under different input voltage levels.

Figure 3:
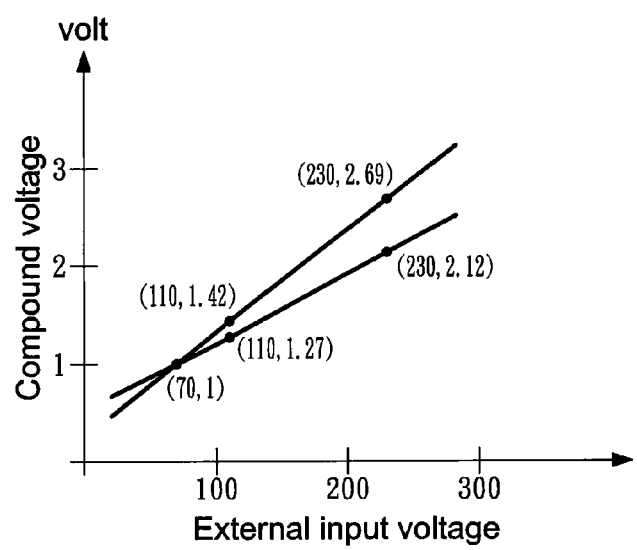
FIG. 3 is a curve chart showing a relationship between an external input voltage and a compound voltage.

Reference is made to FIG. 3 which is a curve chart showing a relationship between an external input voltage and a compound voltage. The abscissa represents the external AC input voltage Vin and the ordinate represents the compound voltage Vc. Based on the above-mentioned circuit topology, two sets of resistance values of the first resistor unit R1 and the second resistor unit R2 are designed and the driven current Id (the sourcing current is exemplified) is also provided to further describe the brown-in voltage setting of the power supply.

It is assumed that the brown-in voltage is equal to AC 70 volts. Hence, the DC input voltage Vb, which is rectified and filtered through the bridge rectifier 30 and the filtering capacitor 40, is about 100 volts when the external AC input voltage Vin is AC 70 volts.

1. It is assumed that the resistance value of the first resistor unit R1 and that of the second resistor unit R2 are 20MΩ and 100KΩ, respectively, and the driven current Id is 5 μA. Hence, the pin voltage Vp=Vb×R2/(R1+R2)=100×100KΩ/(20MΩ+100KΩ)≈0.5 volts. Also, the drop voltage Vr=Id×R2=5 μA×100KΩ=0.5 volts. Accordingly, the compound voltage Vc=Vp+Vr=0.5+0.5=1 volt.

In addition, the first resistor unit R1 and the second resistor unit R2 are designed with different resistance values can fix the brown-in voltage when the external AC input voltage Vin is AC 70 volts (namely, the DC input voltage Vb is about 100 volts).

2. It is assumed that the resistance value of the first resistor unit R1 and that of the second resistor unit R2 are 6.6MΩ and 50KΩ, respectively, and the driven current Id is 5 μA. Hence, the pin voltage Vp=Vb×R2/(R1+R2)=100×50KΩ/(6.6MΩ+50KΩ)≈0.75 volts. Also, the drop voltage Vr=Id×R2=5 μA×50KΩ=0.25 volts. Accordingly, the compound voltage Vc=Vp+Vr=0.75+0.25=1 volt.

Hence, the resistance value of the first resistor unit R1 and that of the second resistor unit R2 can be flexibly designed and the driven current Id is also provided to fix the compound voltage Vc (in this embodiment, the compound voltage Vc is fixed at 1 volt).

In addition, the above-mentioned two sets of resistance values of the first resistor unit R1 and the second resistor unit R2 are designed and the driven current Id is also provided to further describe the over-power protection of the power supply.

1. It is assumed that the resistance value of the first resistor unit R1 and that of the second resistor unit R2 are 20MΩ and 100KΩ, respectively, and the driven current Id is 5 μA. If the AC input voltage Vin increases to 110 volts (namely, the DC input voltage Vb is about 155 volts), the pin voltage Vp=Vb×R2/(R1+R2)=155×100KΩ/(20MΩ+100KΩ)≈0.77 volts. Also, the drop voltage Vr=Id×R2=5 μA×100KΩ=0.5 volts. Accordingly, the compound voltage Vc=Vp+Vr=0.77+0.5=1.27 volts.

In addition, if the AC input voltage Vin increases to 230 volts (namely, the DC input voltage Vb is about 325 volts), the pin voltage Vp=Vb×R2/(R1+R2)=325×100KΩ/(20MΩ+100KΩ)≈1.62 volts. Also, the drop voltage Vr=Id×R2=5 μA×100KΩ=0.5 volts. Accordingly, the compound voltage Vc=Vp+Vr=1.62+0.5=2.12 volts.

Accordingly, when the AC input voltage Vin increases from 110 volts to 230 volts, a compensation ratio of the compound voltage Vc is equal to 1.67 (namely, 2.12/1.27=1.67) based on the first resistor unit R1, the second resistor unit R2, and the driven current Id. Hence, the output power compensation of the power supply can be implemented so that the power supply is operated with an over-power protection under different input voltage levels. In the present situation, the compound voltage Vc can further be fixed at 1 volt when the brown-in voltage is equal to AC 70 volts.

In addition, the first resistor unit R1 and the second resistor unit R2 are designed with different resistance values to provide the over-power protection (OPP) compensation based on the difference of the external AC input voltage Vin. The detailed operation of the OPP compensation is described as follows.

2. It is assumed that the resistance value of the first resistor unit R1 and that of the second resistor unit R2 are 6.6 MCΩ and 50KΩ, respectively, and the driven current Id is 5 μA. If the AC input voltage Vin increases to 110 volts (namely, the DC input voltage Vb is about 155 volts), the pin voltage Vp=Vb×R2/(R1+R2)=155×50KΩ/(6.6MΩ+50KΩ)≈=11.17 volts. Also, the drop voltage Vr=Id×R2=5 μA×50KΩ=0.25 volts. Accordingly, the compound voltage Vc=Vp+Vr=1.17+0.25=1.42 volts.

In addition, if the AC input voltage Vin increases to 230 volts (namely, the DC input voltage Vb is about 325 volts), the pin voltage Vp=Vb×R2/(R1+R2)=325×50KΩ/(6.6MΩ+50KΩ)≈2.44 volts. Also, the drop voltage Vr=Id×R2=5 μA×50KΩ=0.25 volts. Accordingly, the compound voltage Vc=Vp+Vr=2.44+0.25=2.69 volts.

Accordingly, when the AC input voltage Vin increases from 110 volts to 230 volts, a compensation ratio of the compound voltage Vc is equal to 1.89 (namely, 2.69/1.42=1.89) based on the first resistor unit R1, the second resistor unit R2, and the driven current Id. According to different compensation ratios of the two embodiments, it can be seen that the present invention can implement the output power compensation of the power supply so that the power supply is operated with an over-power protection under different input voltage levels. In the present situation, the compound voltage Vc can further be fixed at 1 volt when the brown-in voltage is equal to AC 70 volts. Especially to deserve to be mentioned, the compound voltage Vc can be fixed (be not influenced in respect of the output power compensation) at 1 volt when the brown-in voltage is equal to AC 70 volts.

According to the above-mentioned description, the integrated control circuit can provide the first resistor unit R1, the second resistor unit R2, and the driven current Id to set the fixed brown-in voltage and compensate the output voltage when the power supply is operated under different input voltage levels. As shown in FIG. 3, different lines, as shown by the solid lines but not limited to the two lines, between the compound voltage Vc and the AC input voltage Vin having different slops can be flexibly adjusted by designing the resistance values of the first resistor unit R1 and the second resistor unit R2 and providing the driven current Id to set the fixed brown-in voltage and compensate the output voltage when the power supply is operated under different input voltage levels.

Figure 4:
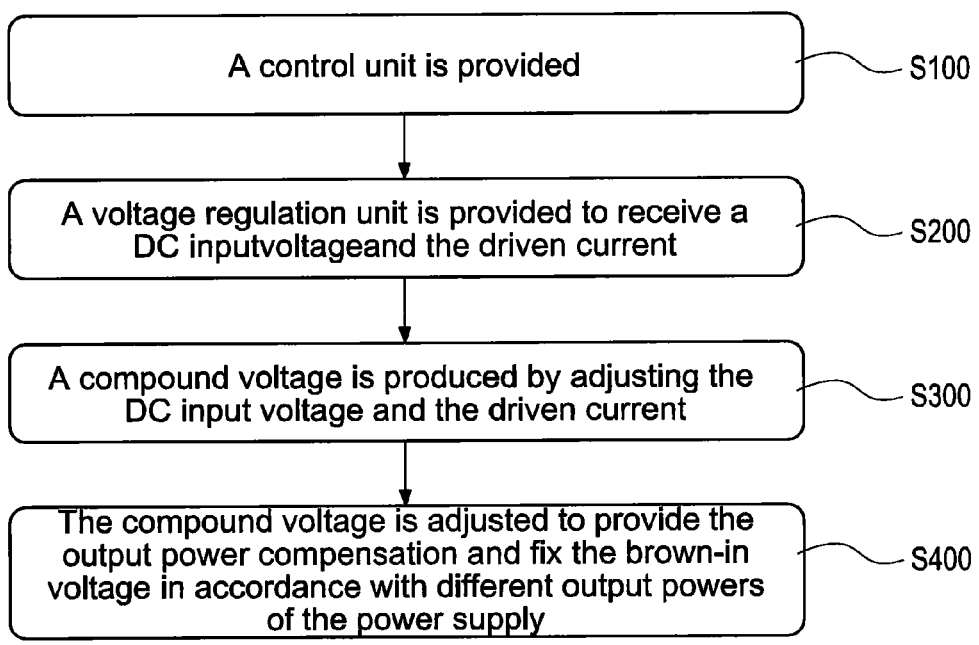
FIG. 4 is a flowchart of a method for operating an integrated control circuit of setting brown-in voltage and compensating output power according to the present invention.
Figure 5:
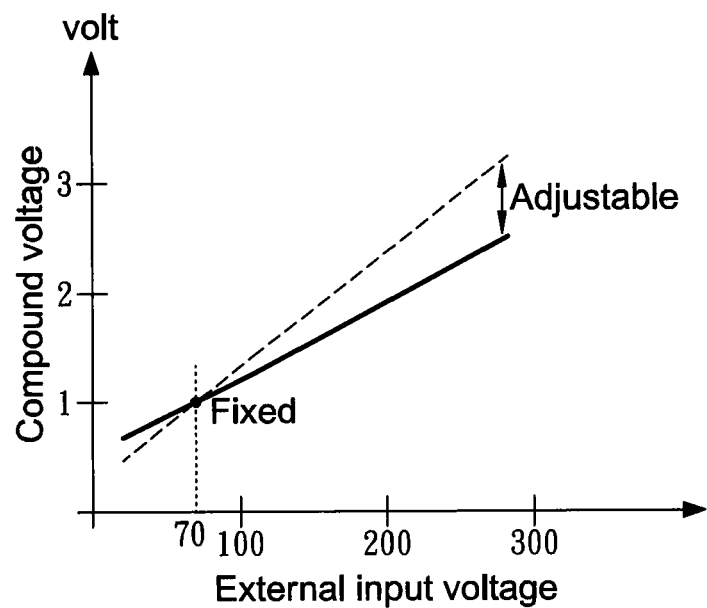
FIG. 5 is a cure chart showing a fixed compound voltage with an adjustable slop.
Figure 6:
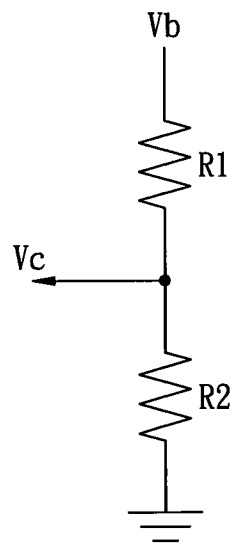
FIG. 6 is a schematic circuit diagram showing a power supply voltage divided into a voltage by two resistors.

Reference is made to FIG. 4 which is a flowchart of a method for operating an integrated control circuit of setting brown-in voltage and compensating output power according to the present invention. The method for operating an integrated control circuit of setting brown-in voltage and compensating output power is applied to a power supply and includes the following steps: First, a control unit is provided (S100). The control unit has a control pin and the control unit outputs or inputs a driven current via the control pin. In particular, the control unit is an integrated circuit chip. Especially to deserve to be mentioned, the driven current can be a sourcing current or a sinking current. If the driven current is a sourcing current, it outward flows from the control unit via the control pin. That is, the control unit outputs the sourcing current via the control pin. On the other hand, if the driven current is a sinking current, it inward flows into the control unit via the control pin. That is, the control unit inputs the sinking current via the control pin. Furthermore, the driven current can be also produced through an inner voltage source and an inner resistor of the control unit.

Afterward, a voltage regulation unit is provided to receive a DC input voltage and the driven current (S200). In particular, the DC input voltage is acquired by rectifying and filtering an external AC input voltage received by the power supply. The voltage regulation unit includes a first resistor unit and a second resistor unit. The first resistor unit has a first terminal and a second terminal. The first terminal is electrically connected to a DC input voltage terminal of the power supply and the second terminal is electrically connected to the control pin of the control unit. The second resistor unit has a third terminal and a fourth terminal. The third terminal is electrically connected to the control pin of the control unit and the fourth terminal is grounded.

Afterward, a compound voltage is produced by adjusting the DC input voltage and the driven current (S300). Because the first resistor unit is electrically connected in series to the second resistor unit, the DC input voltage is divided to produce a pin voltage and the driven current flows through the second resistor unit to produce a drop voltage. According to the superposition principle, the compound voltage equals the sum of the pin voltage and the drop voltage. In particular, the pin voltage equals to the DC input voltage multiplied by a resistance value of the second resistor unit and then divided by the sum of a resistance value of the first resistor unit and that of the second resistor unit. Also, the drop voltage is equal to the product of the driven current and the resistance value of the second resistor unit.

Finally, the compound voltage is adjusted to provide the output power compensation and fix the brown-in voltage in accordance with different output powers of the power supply (S400). Hence, the first resistor unit and the second resistor unit are designed with different resistance values and the driven current is also provided to provide the brown-in voltage setting as well as the output power compensation of the power supply.

Briefly, two key functions of the present invention as follows:

1. For brown-in level, it is adjusted by setting the driven current Id, which is produced from a sourcing current, a sinking current, or through an inner voltage source and an inner resistor), and the second resistor unit R2 when the first resistor R1 is much greater than the second resistor unit R2;

2. For compensating the output power, it is achieved by monitoring the compound voltage Vc at different DC input voltage Vb, wherein the variation of the compound voltage Vc depends on the ratio of R1 and R2. The driven current Id is provided to control a slop of the compound voltage Vc (for output power compensation) according to the DC input voltage Vb and the compound voltage Vc is fixed for a certain value of the DC input voltage Vb.

In conclusion, the present invention has following advantages:

1. The integrated functions of setting brown-in voltage and compensating output power can be used only one pin, thus effectively increase the usability of the IC chips, more particularly to the less-pin IC chip;

2. The brown-in voltage setting and the output power compensation are integrated to provide an adaptive control for the power supply; and 3. A compound voltage can be adjusted to fix the brown-in voltage and compensate the output power when the power supply is operated under different input voltage levels.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An integrated control circuit of setting brown-in voltage and compensating output power, the integrated control circuit applied to a power supply and comprising:
   a control unit having a control pin, and the control unit outputting or inputting a driven current via the control pin; and
   a voltage regulation unit having a first resistor unit and a second resistor unit connected to the first resistor unit in series; the voltage regulation unit electrically connected to the control unit and a DC input voltage terminal of the power supply, and receiving a DC input voltage and the driven current;
   wherein resistance values of the first resistor unit and the second resistor unit are adjusted to divide the DC input voltage to produce a pin voltage, and the driven current is a sourcing current which outward flows from the control unit through the second resistor unit to produce a drop voltage, or the driven current is a sinking current which inward flows into the control unit through the second resistor unit to produce the drop voltage; the pin voltage and the drop voltage are summed up to provide a compound voltage; wherein the resistance value of the first resistor unit is substantially much greater than the resistance value of the second resistor unit so as to increase adaptation and diverseness of adjusting the compound voltage;
   wherein, resistance values of the first resistor unit and the second resistor unit are adjusted, and the driven current is coordinated to provide different compound voltages to produce a plurality of compensation voltages at the same DC input voltage, thus providing the power compensation and fixing the brown-in voltage in accordance with different output powers of the power supply.

2. The integrated control circuit of claim 1, wherein the voltage regulation unit comprises:
   the first resistor unit having a first terminal and a second terminal, and the first terminal electrically connected to the DC input voltage terminal of the power supply and the second terminal electrically connected to the control pin of the control unit;
   the second resistor unit having a third terminal and a fourth terminal, and the third terminal electrically connected to the control pin of the control unit and the fourth terminal grounded.

3. The integrated control circuit of claim 2, wherein the pin voltage equals to the DC input voltage multiplied by a resistance value of the second resistor unit and then divided by the sum of a resistance value of the first resistor unit and a resistance value of the second resistor unit.

4. The integrated control circuit of claim 2, wherein the drop voltage is equal to the product of the driven current and a resistance value of the second resistor unit.

5. The integrated control circuit of claim 1, wherein the driven current is provided to control a slop of the compound voltage according to the DC input voltage and the compound voltage is fixed for a certain value of the DC input voltage.

6. The integrated control circuit of claim 1, wherein the driven current is produced through an inner voltage source and an inner resistor of the control unit.

7. The integrated control circuit of claim 1, wherein the control unit is an integrated circuit chip.

8. A method for operating an integrated control circuit of setting brown-in voltage and compensating output power, the method for operating the integrated control circuit applied to a power supply, the integrated control circuit having a control unit with a control pin, and having a voltage regulation unit with a first resistor unit and a second resistor unit connected to the first resistor unit in series, the method comprising the steps:
(a) outputting or inputting a driven current via the control pin from or to the control unit;
(b) receiving a DC input voltage and the driven current by the voltage regulation unit;
(c) adjusting resistance values of the first resistor unit and the second resistor unit to divide the DC input voltage to produce a pin voltage, and the driven current is a sourcing current which outward flows from the control unit through the second resistor unit to produce a drop voltage, or the driven current is a sinking current which inward flows into the control unit through the second resistor unit to produce the drop voltage; the pin voltage and the drop voltage are summed up to provide a compound voltage; wherein the resistance value of the first resistor unit is substantially much greater than the resistance value of the second resistor unit so as to increase adaptation and diverseness of adjusting the compound voltage; and
(d) adjusting resistance values of the first resistor unit and the second resistor unit, and the driven current is coordinated to provide different compound voltages to produce a plurality of compensation voltages at the same DC input voltage, thus providing the output power compensation and fixing the brown-in voltage in accordance with different output powers of the power supply.

9. The method for operating the integrated control circuit of claim 8, wherein the voltage regulation unit comprising:
the first resistor unit having a first terminal and a second terminal, and the first terminal electrically connected to the DC input voltage terminal of the power supply and the second terminal electrically connected to the control pin of the control unit;
the second resistor unit having a third terminal and a fourth terminal, and the third terminal electrically connected to the control pin of the control unit and the fourth terminal grounded.

10. The method for operating the integrated control circuit of claim 9, wherein the pin voltage equals to the DC input voltage multiplied by a resistance value of the second resistor unit and then divided by the sum of a resistance value of the first resistor unit and a resistance value of the second resistor unit.

11. The method for operating the integrated control circuit of claim 9, wherein the drop voltage is equal to the product of the driven current and a resistance value of the second resistor unit.

12. The method for operating the integrated control circuit of claim 8, wherein the driven current is produced through an inner voltage source and an inner resistor of the control unit.

13. The method for operating the integrated control circuit of claim 8, wherein the control unit is an integrated circuit chip.

* * * * *